(12) United States Patent
Birchak et al.

(10) Patent No.: US 6,478,107 B1
(45) Date of Patent: Nov. 12, 2002

(54) AXIALLY EXTENDED DOWNHOLE SEISMIC SOURCE

(75) Inventors: James R. Birchak, Spring; Robert L. Malloy, Katy; Carl A. Robbins, Tomball; Eugene J. Linyaev; David J. Young, both of Houston, all of TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/565,301

(22) Filed: May 4, 2000

(51) Int. Cl.$^7$ .................................................. G01V 1/02
(52) U.S. Cl. ...................... 181/113; 181/111; 181/104; 181/106; 181/108; 181/119
(58) Field of Search .................. 181/104, 106, 181/108, 111, 113, 119

(56) References Cited

U.S. PATENT DOCUMENTS

| 3,756,763 A | * | 9/1973 | Elmore et al. ................. 431/1 |
| 4,716,555 A | * | 12/1987 | Bodine ......................... 367/35 |
| 4,928,783 A | | 5/1990 | Crook ......................... 181/106 |
| 5,438,170 A | | 8/1995 | Klaveness .................... 181/106 |
| 5,491,306 A | * | 2/1996 | Gram .......................... 181/106 |

FOREIGN PATENT DOCUMENTS

| EP | 0393880 | 10/1990 |

OTHER PUBLICATIONS

"Feasibility of Borehole Acoustic Look–Ahead 'BALA' using Delphian Imaging," ARCHIE Conference, Visualization Technology to Find and Develop More Oil and Gas, May 14–18, 1995, The Woodlands, Texas—Revised Mar. 8, 1995 (10 pp.).

* cited by examiner

Primary Examiner—Shih-yung Hsieh
(74) Attorney, Agent, or Firm—Conley, Rose & Tayon, P.C.

(57) ABSTRACT

An axially extended downhole seismic source is disclosed. In one embodiment, the seismic source includes multiple pressure storage chambers, each having an inlet valve and an outlet valve. The inlet valve is coupled between the pressure storage chamber and the interior of the drill string, and the outlet valve is similarly coupled between the pressure storage chamber and the annular space around the drill string. A compressible fluid may be provided in the pressure storage chambers, and pistons may be positioned to contact the compressible fluid. For each pressure storage chamber, an inlet piston contacts the compressible fluid and fluid inside the drill string, while an outlet piston contacts the compressible fluid and fluid in the annular space around the drill string. When the outlet valve is closed, the inlet valve can be opened to allow pressure inside the drill string to compress the compressible fluid inside the pressure storage chamber. Subsequently closing the inlet valve and opening the outlet valve causes fluid to be ejected into the annular space, thereby generating seismic waves. The use of multiple pressure storage chambers allows the pressure front from the seismic source to be extended axially to advantageously increase the fraction of seismic energy transmitted into the formation while preventing damage to the formation.

10 Claims, 4 Drawing Sheets

AXIALLY EXTENDED DOWNHOLE SEISMIC SOURCE

BACKGROUND OF THE INVENTION

The present invention relates to a seismic source suitable for downhole use. More particularly, the present relates to a re-useable acoustic source which couples well with the formation surrounding a well bore.

In drilling a borehole to recover oil or other fluids from the earth, it is often helpful to turn or steer the downhole drill bit toward or away from subterranean targets. To facilitate this geophysical steering, drillers need to know drill bit location on the surface seismic section. The location of targets ahead of the bit is also required, as well as some warning or indication of drilling hazards such as over-pressured formations or thin, shallow gas intervals. Surface seismic surveys may be used to obtain this information, but resolution and depth location is poor because surface seismic surveys are time based (rather than depth based). For example, to determine the depth of a reflection, a speed of sound for the formation must be known. Consequently, these systems require depth calibration to accurately determine locations of target horizons or drilling hazards. Traditionally, this calibration has been provided by either offset well sonic data or wireline checkshot data in the current well. Offset data is often inadequate due to horizontal variations in stratigraphy between wells. Wireline checkshots require tripping (i.e., removing) the bit out of the hole and are often prohibitively expensive for this reason.

During surface seismic surveys, a plurality of seismic sources and seismic receivers are placed on the surface of the earth. The seismic sources are separately triggered to generate seismic waves. These seismic waves travel downward through the earth until reflected off some underground object or change in rock formation. The reflected seismic waves then travel upward and are detected at the seismic receivers on the surface. One or more clocks at the surface measure the time from generation of the seismic waves at each source to the reception of the seismic waves at each receiver. This gives an indication of the depth of the detected object underground. However, the exact speed of sound for these seismic waves is unknown, and thus, the exact depth of the detected object is also unknown. To more closely measure the exact speed of sound, a "wireline checkshot" may be used to calibrate depth measurements. During a "wireline checkshot," a receiver on a "wireline" is lowered a known distance into an already-drilled borehole. A surface seismic source is then triggered and the time is measured for the seismic wave to travel to the wireline receiver. Because the depth of the wireline receiver is known, an average interval velocity indicating the average speed of the seismic wave can be determined with some degree of accuracy.

A more direct solution to the depth resolution problem is known as "vertical seismic profiling", or VSP. In VSP, an array of receivers is located along the vertical length of a borehole and a plurality of seismic sources are located on the surface. As before, the seismic sources produce seismic waves that propagate through the earth and reflect from interfaces in the formation. The receivers detect both the reflections and an initial, un-reflected seismic wave that has propagated through the formations (unlike the surface surveys where the initial seismic wave only propagates along the surface). The initial seismic wave provides additional information to allow accurate determination of formation interface depths.

An alternative, but related, solution is known as "reverse vertical seismic profiling". This approach transposes the downhole location of the receivers with the surface location of the seismic sources. Some drill bits generate a significant amount of seismic noise that can be detected by receivers on the surface. Since the position of the drill bit varies as the hole is drilled, enough information can be gathered to build model of the formation. While reverse VSP is not limited to using drill bits as seismic sources, the prior art efforts have been focused in this direction. However, there are many important situations in which a drill bit is inadequate to the task of generating the requisite seismic energy. For example, diamond bits offer numerous advantages to drilling, but they cut too quietly. Soft formations, when cut by any drill bit, also fail to generate sufficient noise.

Some attempts have been made to create alternative downhole seismic sources. A source by Klaveness, (U.S. Pat. No. 5,438,170, hereby incorporated herein by reference), is akin to a drilling jar that causes sudden, forceful ejection of fluid into the wellbore. However, this source generates large tool modes, large tube waves, and poor seismic signals. Another known source vibrates the bit with a piezoelectric transducer. It has a very short range and can only be used with downhole receivers. Unfortunately, when the receivers are downhole with the source, high-pressure formations ahead of the bit cannot be distinguished from other reflective boundaries. An air gun has also been placed downhole, but requires air lines from the surface. Air guns and water guns are not ideal downhole sources because they are localized sources that create large tube waves, require intrusive pressure systems, and may damage the formation. As an experimental downhole source, a explosive charge has been used successfully to reduce formation damage and tube wave intensity. However, explosive charges are not re-useable and may be dangerous in some drilling environments.

SUMMARY OF THE INVENTION

The above problems are solved by an axially extended downhole seismic source. In one embodiment, the seismic source includes multiple pressure storage chambers, each having an inlet valve and an outlet valve. The inlet valve is coupled between the pressure storage chamber and the interior of the drill string, and the outlet valve is similarly coupled between the pressure storage chamber and the annular space around the drill string. A compressible fluid may be provided in the pressure storage chambers and pistons may be positioned to contact compressible fluid. For each pressure storage chamber, an inlet piston contacts the compressible fluid and fluid inside the drill string, while an outlet piston contacts the compressible fluid and fluid in the annular space around the drill string. When the outlet valve is closed, the inlet valve can be opened to allow pressure inside the drill string to compress the compressible fluid inside the pressure storage chamber. Subsequently closing the inlet valve and opening the outlet valve causes fluid to be ejected into the annular space, thereby generating seismic waves. The use of multiple pressure storage chambers allows the pressure front from the seismic source to be extended axially to advantageously increase the fraction of seismic energy transmitted into the formation while preventing damage to the formation.

BRIEF DESCRIPTION OF THE DRAWINGS

For a more detailed description of the preferred embodiment of the present invention, reference will now be made to the accompanying drawings, in which.

Figure 1:
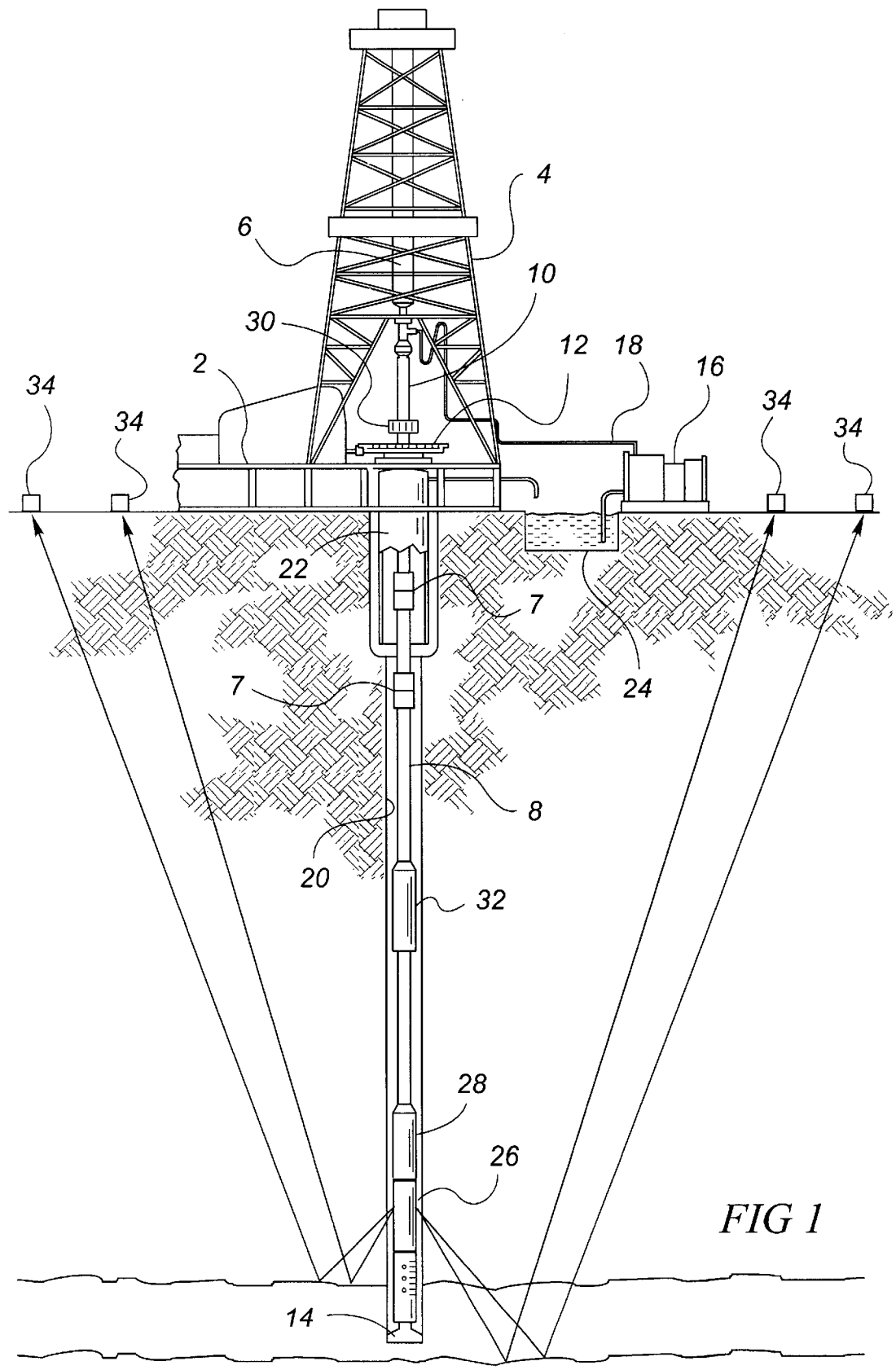
FIG. 1 is an environmental view of a well in which a downhole seismic source is used for reverse seismic profiling.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Turning now to the figures, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that is used to lower the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods. Drilling fluid, termed "mud", is pumped by mud recirculation equipment 16 through supply pipe 18, through drilling kelly 10, and down through the drill string 8 at high pressures and volumes (such as 3000 p.s.i. at flow rates of up to 1400 gallons per minute) to emerge through nozzles or jets in the drill bit 14. The mud then travels back up the hole via the annulus formed between the exterior of the drill string 8 and the borehole wall 20, through the blowout preventer 22, and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

Downhole instrument sub 26 is coupled to an telemetry transmitter 28 that communicates with the surface to provide telemetry signals and receive command signals. A surface transceiver 30 may be coupled to the kelly 10 to receive transmitted telemetry signals and to transmit command signals downhole. One or more repeater modules 32 may be provided along the drill string to receive and retransmit the telemetry and command signals.

In a preferred embodiment, downhole instrument sub 26 includes seismic source as described further below. The seismic source transmits seismic waves that reflect off of formations around and ahead of bit 14 and are received at the surface by an array of seismic sensors 34. Alternatively, an array of sensors may be mounted along the drill string 8 to receive the reflected waves. The sensors may be hydrophones, geophones, and accelerometers. The geophones and accelerometers may be multi-axis sensors.

Figure 2:
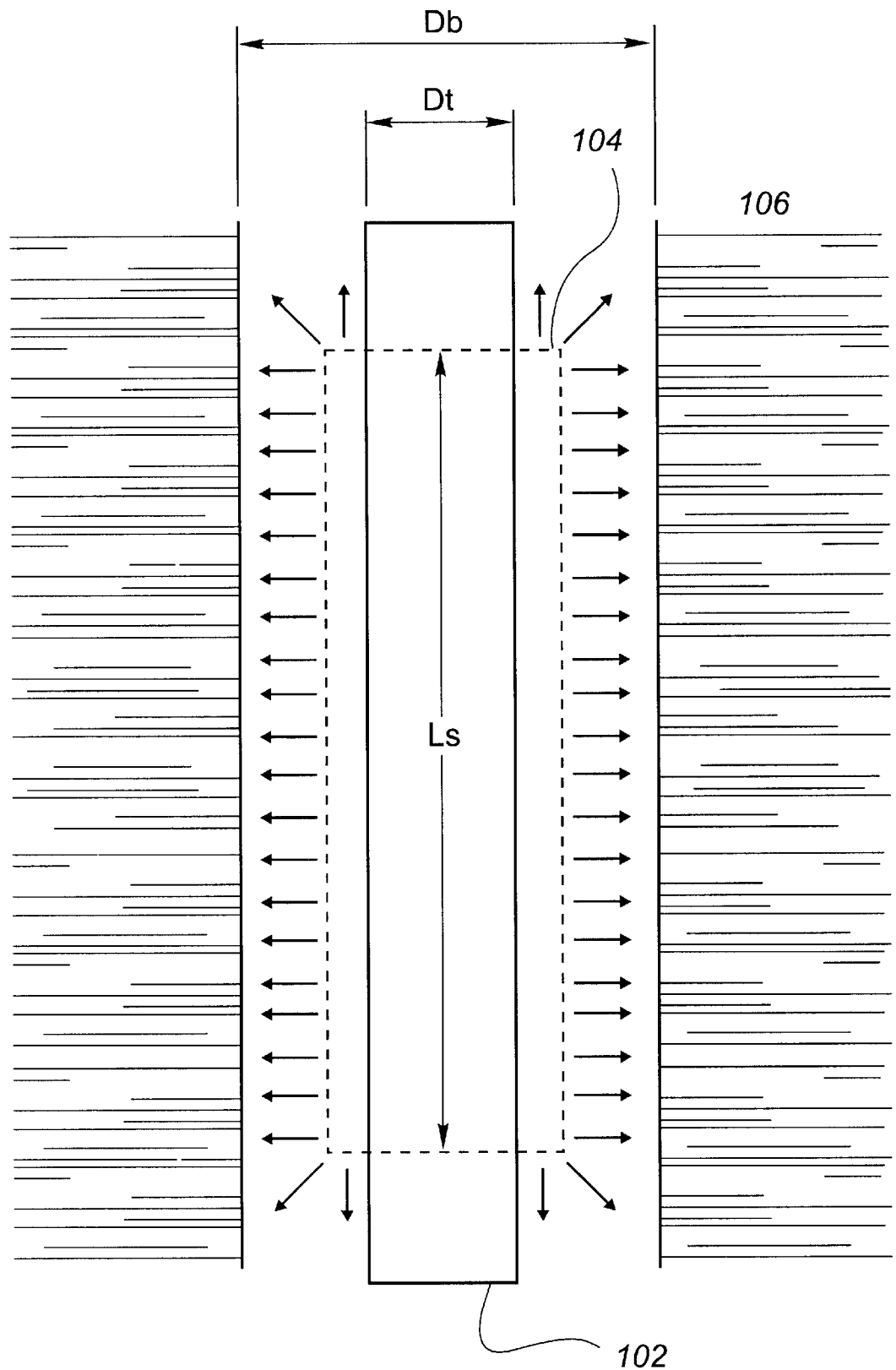
FIG. 2 is a schematic illustration of a pressure wave emitted by a downhole seismic source.

FIG. 2 shows a downhole seismic source 102 emitting a pressure wave 104 into a borehole surrounded by formation 106. For the sake of discussion, the pressure wave 104 is shown as a cylinder of inner diameter Dt, outer diameter Db, and length Ls. To minimize damage to the borehole walls and avoid collapsing the borehole, the pressure exerted on the walls must be below a set maximum limit Pm. The seismic energy coupled through the borehole walls into the formation is proportional to the force exerted on the walls:

$$Fw=Pm*Ls*\pi*Db.$$

Increasing the seismic source length Ls increases the seismic energy provided to the formation. On the other hand, the seismic energy transmitted axially along the drill string is proportional to:

$$Fa=Pm*\pi*(Db^2-Dt^2)/4.$$

Consequently, the seismic energy transmitted axially is relatively independent of the seismic source length. Nevertheless, a larger fraction of the total seismic energy enters the formation for larger source lengths Ls, and this will improve the signal to noise ratio of the formation wave to the tube wave.

Currently, the preferred method for creating an elongated source is to use an array of closely-spaced sources. The sources are ideally spaced so as to create a relatively constant pressure on the borehole wall. To do this, the sources should be within one half wavelength (as measured in the formation) of each other. Although this is the preferred approach, wider spacings may be used. The source spacing and activation timing can be controlled to focus the seismic energy using standard linear array techniques. Details regarding linear arrays and how timing and spacing affects the pattern of emitted energy may be found in Chapter 3 (pages 108–168) of W. L. Stutzman and G. A. Thiele's *Antenna Theory and Design,* published in 1981 by John Wiley & Sons, Inc., and hereby incorporated herein by reference.

Figure 3:
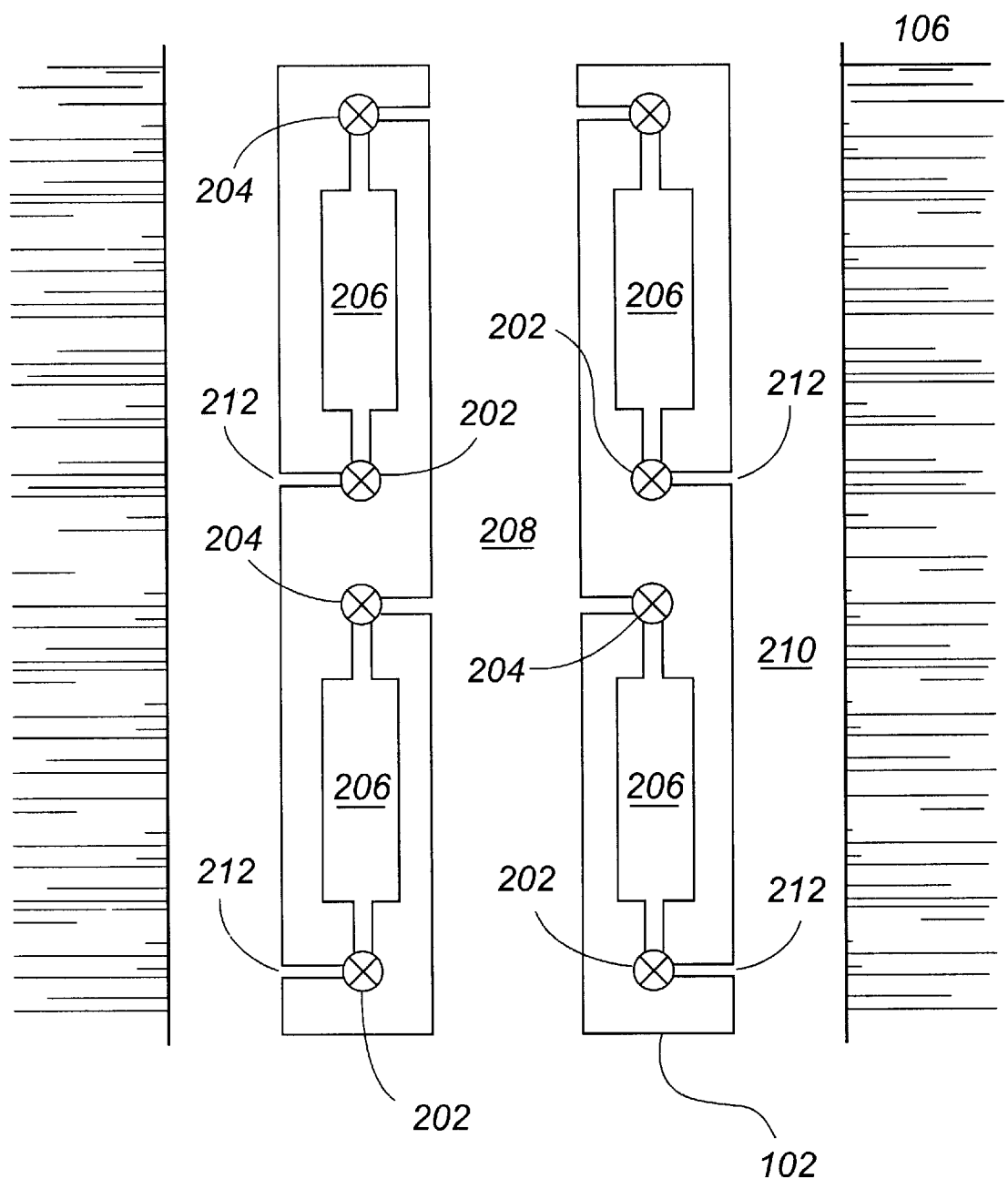
FIG. 3 is a cross-sectional schematic of a preferred embodiment of a downhole seismic source.

FIG. 3 shows a cutaway view of one embodiment of seismic source 102. Seismic source 102 is a drill collar having multiple pressure storage chambers 206. Each pressure storage chamber has an inlet valve 204 and an outlet valve 202. While the interior 208 of the drill string is pressurized by the surface mud pumps, the outlet valve 202 is closed and the inlet valve 204 is opened. The pressure in the interior 208 of the drill string is allowed to pressurize the pressure storage chambers 206, and at some point after this occurs, the inlet valves 204 are closed.

It is noted that other methods may be used to pressurize the pressure storage chambers. For example, the drill string may be equipped with a telescoping member. With the telescoping member extended by the weight of the drill bit, the outlet valves are closed. The telescoping member is then collapsed, e.g. by lowering the weight of the drilling string, and this compresses fluid contained in the pressure storage chambers.

Before the elongated seismic source is activated, the drilling activity is suspended and the mud pumps are shut down. Once the noise has died out, the outlet valves 202 are triggered, causing a sudden pressure release into annulus 210. The outlet valves may be triggered simultaneously, or, for directional focusing of the seismic energy, they may be triggered sequentially. It is noted that the pressure chambers outlets are preferably oriented symmetrically so that there is no net change of momentum imparted to the drill string when the source is activated. The outlets 212 may be provided with nozzles or shaped to control the pressure release rate. This is believed to provide control over the frequency spectrum of generated seismic waves. Multiple opening shapes and sizes may be used. For example, each of the outlets 212 of seismic source 102 may be equipped with a disc having various apertures around its periphery. Commands from the surface could cause a control module for the seismic source to rotate the disc to a selected position before triggering the source. The seismic source could then generate seismic waves having varied frequency spectra, allowing an analysis of the frequency-dependent characteristics of the formation.

Figure 4:
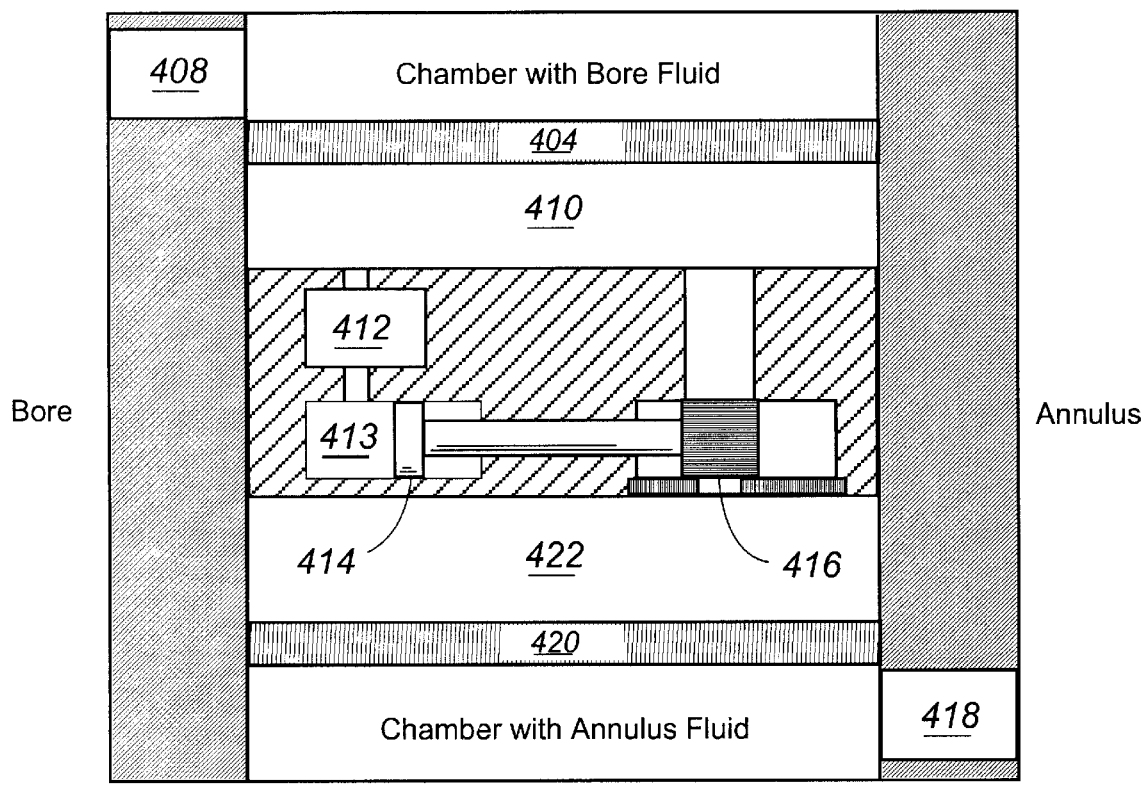
FIG. 4 is a schematic view of a pressure storage chamber embodiment.

FIG. 4 shows a schematic cross-sectional view of one contemplated pressure storage chamber embodiment. The pressure storage chamber 410 contains a compressible fluid, e.g. Dow Corning Silicone Oil DC-200 with 1 cs viscosity. An inlet piston 404 is mounted in pressure storage chamber 410. When inlet valve 408 is opened and pressure release valve (slide valve) 416 is closed, inlet piston 404 can be forced downward to compress the fluid in the pressure storage chamber. The downward motion of piston 404 may be caused by pressure from the bore of the drill string. Such pressure may be provided while pumps are on. A spring (not shown) may be included in the inlet chamber 410 to return the piston to the original position in the absence of high pressure in the drill string bore.

Once the fluid in pressure storage chamber 410 is compressed, the pressure may be trapped by closing inlet valve 408. To minimize extraneous seismic noise, the pumps are preferably turned off before the triggering of the downhole seismic source. To release the pressure, an outlet valve 418 is first opened to the annulus. Then slide valve 416 may be opened by a pilot valve 412. To improve the performance and reliability of the pressure release valve 416, it is preferably designed to use the pressure in storage chamber 410 to operate. This pressure is preferably gated by an electrically operated pilot valve 412. Consequently, to open slide valve 416, the pilot valve 412 is first momentarily opened. The pressure operates on a piston 414, causing it to force open slide valve 416. Slide valve 416 preferably operates in a chamber containing a low viscosity, high compressibility liquid.

Opening slide valve 416 releases the pressure into an outlet chamber 422 which contains an outlet piston 420 mounted within. The pressurized fluid from pressure chamber 410 forces outlet piston 420 downward, causing a stream of drilling mud to be forcefully ejected from the outlet chamber 422 into the annulus. This causes the pressure surge that generates the desired seismic waves. To allow the pistons to return to the original positions, the inlet valve 408 is opened while the slide valve is held open by pressure trapped in piston chamber 413 or other auxiliary means (not specifically shown). It is noted that the inlet and outlet valves are preferably operated when little pressure is applied to them.

This system may advantageously be used to improve a technique called reverse vertical seismic profiling. The system can be used to avoid or otherwise take precautionary measures with respect to drilling hazards ahead of the bit. For example, high resolution and an accurately known depth to drilling hazards allows mud weight modification to, e.g., prevent blowouts when high pressure formations are encountered.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A seismic source which comprises:
    a first outlet to an annulus around the seismic source;
    a first outlet valve coupled between the first outlet and a first pressure storage chamber;
    a first inlet from an interior of a tubing string;
    a first inlet valve coupled between the first inlet and the first pressure storage chamber,
        wherein pressure is stored in the first pressure storage chamber via the first inlet and the first inlet valve;
    a second outlet to the annulus around the seismic source, wherein the second outlet is axially spaced apart from the first outlet; and
    a second outlet valve coupled between the second outlet and a second pressure storage chamber.

2. The seismic source of claim 1, further comprising:
    a second inlet from the interior of the tubing string; and
    a second inlet valve coupled between the second inlet and the second pressure storage chamber, wherein pressure is stored in the second pressure storage chamber via the second inlet and the second inlet valve.

3. The seismic source of claim 2, further comprising:
    a first inlet piston having one face in contact with a compressible fluid in the first pressure storage chamber, and an opposite face exposed to fluid from the interior of the tubing string;
    a first outlet piston having one face in contact with the compressible fluid in the first pressure storage chamber, and an opposite face exposed to fluid from the annulus around the seismic source;
    a second inlet piston having one face in contact with a compressible fluid in the second pressure storage chamber, and an opposite face exposed to fluid from the interior of the tubing string; and
    a second outlet piston having one face in contact with the compressibe fluid in the second pressure storage chamber, and an opposite face exposed to fluid from the annulus around the seismic source.

4. The seismic source of claim 1, further comprising:
    a third outlet to the annulus around the seismic source, wherein the third outlet is axially spaced apart from the first and second outlets;
    a third outlet valve coupled between the third outlet and a third pressure storage chamber.

5. The seismic source in any of claim 1, wherein the first and second outlet valves are configured to release pressure from the respective pressure storage chambers in a substantially simultaneous fashion.

6. The seismic source in any of claim 1, wherein the outlets are spaced less than half a wavelength apart.

7. A method of generating seismic waves in a formation surrounding a borehole, wherein the method comprises:
    pressurizing a plurality of pressure storage chambers, wherein said pressurizing includes:
        closing a respective outlet valve for each of the plurality of pressure storage chambers,
        increasing pressure in tubing string, and
        closing a respective inlet valve for each of the plurality of pressure storage chambers; and
    releasing pressure from each of said plurality of pressure storage chambers through a respective plurality of outlets distributed axially along a tool located in said borehole, thereby ejecting fluid into an annulus around said tool.

8. The method of claim 7, wherein said releasing pressure includes:

opening the outlet valves in a substantially simultaneous fashion.

9. The method of claim 7, wherein each of the plurality of pressure storage chambers includes:

an inlet piston coupled between the inlet valve and the pressure storage chamber;

an outlet piston coupled between the outlet valve and the pressure storage chamber; and a compressible fluid contained in the pressure storage chamber by the inlet and outlet pistons.

10. The method of claim 7, wherein the plurality of outlets are less than half of a wavelength apart.

* * * * *